US010307991B2

(12) United States Patent
Speicher et al.

(10) Patent No.: US 10,307,991 B2
(45) Date of Patent: Jun. 4, 2019

(54) LAMINATES WITH FLUOROPOLYMER CLOTH

(71) Applicant: Saint-Gobain Performance Plastics Pampus GMBH, Willich (DE)

(72) Inventors: Jens Speicher, Willich (DE); Andreas Waldöfner, Duisburg (DE); Alexander Oehrlein, Kleinenbroich (DE); Julia Ziegler, Ratingen (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 689 days.

(21) Appl. No.: 14/502,995

(22) Filed: Sep. 30, 2014

(65) Prior Publication Data
US 2015/0093066 A1  Apr. 2, 2015

Related U.S. Application Data

(60) Provisional application No. 61/884,799, filed on Sep. 30, 2013.

(51) Int. Cl.
B32B 15/14 (2006.01)
F16C 33/20 (2006.01)
(Continued)

(52) U.S. Cl.
CPC .............. *B32B 15/14* (2013.01); *B32B 1/00* (2013.01); *B32B 3/28* (2013.01); *B32B 5/02* (2013.01); *B32B 7/12* (2013.01); *B32B 27/322* (2013.01); *B32B 37/10* (2013.01); *B32B 37/185* (2013.01); *F16C 33/201* (2013.01); *F16C 33/203* (2013.01); *F16C 33/205* (2013.01);
(Continued)

(58) Field of Classification Search
None
See application file for complete search history.

(56) References Cited

U.S. PATENT DOCUMENTS 2,906,573 A   9/1959  Runton
3,950,599 A   4/1976  Board, Jr.
(Continued)

FOREIGN PATENT DOCUMENTS

CN   1035871 A    9/1989
CN   101788015 A  7/2010
(Continued)

OTHER PUBLICATIONS

Machine translation of CN102145556, Tongsheng et al., Aug. 2011.*
(Continued)

*Primary Examiner* — Shawn Mckinnon
(74) *Attorney, Agent, or Firm* — Abel Law Group, LLP; Chi Suk Kim

(57) ABSTRACT

A laminate includes a metal substrate and a sliding layer overlying the metal substrate. The sliding layer can include a polymer fabric. The polymer fabric can include first polymer P1. The sliding layer can further included a melt-processable matrix polymer. The melt-processable matrix polymer can include a second polymer P2. In embodiments, either P1 or P2 is a fluoropolymer. The sliding layer can further include a filler. In embodiments, the total amount of fluoropolymer and filler in the sliding layer is at least 30 vol %.

19 Claims, 2 Drawing Sheets

(51) Int. Cl.
*B32B 3/28* (2006.01)
*B32B 27/32* (2006.01)
*B32B 37/18* (2006.01)
*B32B 7/12* (2006.01)
*B32B 5/02* (2006.01)
*B32B 1/00* (2006.01)
*B32B 37/10* (2006.01)
*F16C 33/28* (2006.01)
*B32B 37/08* (2006.01)

(52) U.S. Cl.
CPC ............ *F16C 33/208* (2013.01); *B32B 37/08* (2013.01); *B32B 2250/03* (2013.01); *B32B 2260/021* (2013.01); *B32B 2260/046* (2013.01); *B32B 2262/02* (2013.01); *B32B 2262/0238* (2013.01); *B32B 2262/0253* (2013.01); *B32B 2305/07* (2013.01); *B32B 2305/18* (2013.01); *B32B 2307/54* (2013.01); *B32B 2307/746* (2013.01); *B32B 2309/02* (2013.01); *B32B 2309/04* (2013.01); *B32B 2309/12* (2013.01); *B32B 2327/18* (2013.01); *F16C 33/206* (2013.01); *F16C 33/28* (2013.01); *F16C 2208/22* (2013.01); *F16C 2240/54* (2013.01); *F16C 2240/60* (2013.01); *Y10T 428/24636* (2015.01); *Y10T 428/249921* (2015.04)

(56) References Cited

U.S. PATENT DOCUMENTS

| | | |
|---|---|---|
| 4,285,168 A | 8/1981 | Scheetz |
| 4,596,736 A | 6/1986 | Eichhorn et al. |
| 6,858,293 B2 | 2/2005 | Flosenzier et al. |
| 8,351,687 B1 | 1/2013 | Bradford et al. |
| 8,802,602 B2 | 8/2014 | Schmitjes et al. |
| 2003/0180528 A1 | 9/2003 | Flosenzier et al. |
| 2004/0213492 A1 | 10/2004 | Kim et al. |
| 2009/0052822 A1* | 2/2009 | Hardgrave ............... F16C 33/20 384/300 |
| 2011/0026864 A1 | 2/2011 | Than Trong et al. |

FOREIGN PATENT DOCUMENTS

| | | |
|---|---|---|
| CN | 102145556 A | 8/2011 |
| EP | 0058264 A1 | 8/1982 |
| EP | 0394518 A1 | 10/1990 |
| EP | 2484713 A1 | 8/2012 |
| GB | 840602 A | 7/1960 |
| GB | 2407322 A | 4/2005 |
| JP | S6249018 A | 3/1987 |
| JP | H06228329 A | 8/1994 |
| JP | 2001017918 A | 1/2001 |
| JP | 2004306544 A | 11/2004 |
| JP | 2006182873 A | 7/2006 |
| JP | 2010525245 A | 7/2010 |
| JP | 2011140549 A | 7/2011 |
| WO | 8505593 A1 | 12/1985 |
| WO | 2004094850 A1 | 11/2004 |
| WO | 2015044458 A1 | 4/2015 |

OTHER PUBLICATIONS

International Search Report issued in PCT/EP2014/070964 dated Nov. 7, 2014, 1 page.
Database WPI, Week 199437, Thomson Scientific, London, GB; AN 1994-299888 & JPH06228329A (NTN Corp), Aug. 16, 1994.

\* cited by examiner

LAMINATES WITH FLUOROPOLYMER CLOTH

CROSS-REFERENCE TO RELATED APPLICATION(S)

This application claims priority under 35 U.S.C. § 119(e) to U.S. Patent Application No. 61/884,799 entitled "Laminates with Fluoropolymer Cloth," by Jens Speicher, Andreas Waldöfner, Alexander Oehrlein and Julia Ziegler, filed Sep. 30, 2013, which is assigned to the current assignee hereof and incorporated herein by reference in its entirety.

FIELD OF THE DISCLOSURE

The disclosure relates to laminates comprising a fluoropolymer fabric and a fluoropolymer film.

BACKGROUND

Conventional metal polymer plain bearings with polymer based sliding surfaces are typically composed of two-layer or three-layer composite bearing structures. Both forms rely on a metal backing to provide rigidity and allow the material to be formed into the appropriate shape, more commonly a cylinder. The metal polymer two-layer bearing materials typically rely on directly-applied or adhered polymers. The design of the three-layered bearing typically rely on an adhesive or porous metallic interlayer to attach the polymer bearing lining to the metal backing. In any case, a critical part of providing the appropriate load bearing and tribological characteristics is the composition of the sliding layer.

Chemically resistant layers, such as those made of polytetrafluoroethylene (PTFE), are widely used in industry to protect sensitive parts of machinery or equipment from the corrosive effects of acids or other chemicals. One such use is in one or two piece pump diaphragms commonly used with air or electrically driven diaphragm pumps. In the two piece diaphragms, an outer PTFE overlay diaphragm is commonly used to protect an inner rubber diaphragm from materials that would cause rapid failure of the rubber part alone. In some other cases, the PTFE provides the sole material of construction of the diaphragm.

EP 0 394 518 A1 describes a multilayer slide bearing material in which the metallic support material preferably consists of cold-rolled steel on which a layer of a copolymer of perfluoro(alkyl vinyl ether) and tetrafluoroethylene has been applied as intermediate layer. A sliding layer composed of a PTFE compound material is in turn applied to the intermediate layer. In this slide bearing material, the intermediate layer has the function of establishing firm adhesion of the sliding layer to the support material. In order firstly to ensure adhesion of the intermediate layer to the support material, the surface of the metallic support material in this known slide bearing material has to be pretreated in a suitable manner by wet chemical means. The best results appear to be achieved by chromating of the surface of the metallic support. However, this process is problematical for a variety of reasons, including environmental issues and others. As such, there is a continued need for improved slide bearings.

Moreover, the performance properties of the sliding layer depend from a variety of factors such as the strength of adhesion to the metal backing and the inherent tribological properties of the sliding layer. In conventional bearings, the friction properties of the sliding layer, absent any post-production lubrication, e.g., grease or oil, depend from the amount of a fluoropolymer and/or a filler present in the sliding layer. The majority of the sliding layer usually comprises a non-fluorinated thermoplastic polymer or curable resin that provides structural integrity of the sliding layer. However, the total amount of friction providing fillers or fluoropolymers does not exceed 30 vol %. For example, US 2009/0052822 discloses extrusion-type bearings, which limits in its embodiments the amount of a fluoropolymer in the sliding layer to 20 vol % and the amount of another filler therein to 8 vol %, totaling the friction providing ingredients in the sliding layer to not more than 28 vol %. As such, there is a need to improve slide bearings by increasing the amount of the friction providing ingredients.

Therefore, it would be advantageous if a bearing composite could be produced that would combine the physical demands of the above described bearing with an improvement of the tribological properties of the sliding layers.

SUMMARY

In a first aspect, a laminate comprising includes a metal substrate and a sliding layer overlying the metal substrate. The sliding layer can include a polymer fabric. The polymer fabric can include first polymer P1. The sliding layer can further included a melt-processable matrix polymer. The melt-processable matrix polymer can include a second polymer P2. In embodiments, either P1 or P2 is a fluoropolymer.

In a second aspect, an article includes. The laminate includes a metal substrate and a sliding layer. The sliding layer can overlie the metal substrate. The sliding layer can include a polymer fabric. The polymer fabric can include a first polymer P1. The sliding layer can further include a matrix polymer. The matrix polymer can include a second polymer P2. Either P1 or P2 can be a fluoropolymer. In embodiments, the laminate can include a bend. The bend can have a bend radius of at least 0.005 mm.

In a third aspect, a method of manufacturing a laminate can include providing a metal substrate. The method can further include overlying a ply of a polymer fabric onto the metal substrate. The method can further include overlying a polymer sheet onto the ply opposite to the metal substrate to form a stack. The method can further include compressing the stack at a pressure of at least 0.05 MPa. The method can further include heating the stack to a temperature of at least the glass transition temperature $T_g$ of the polymer sheet for a first duration of at least 100 seconds.

In yet one further aspect, a method of manufacturing a laminate can include providing a metal substrate. The method can further include applying an adhesive sheet onto the metal substrate. The method can further include overlying a ply of a polymer fabric onto the adhesive sheet. The method can further include overlying a polymer sheet onto the ply opposite to the metal substrate to form a stack. The method can further include compressing the stack at a pressure of at least about 0.05 MPa. The method can further include heating the stack to a first temperature of at least the melting temperature $T_m$ of the adhesive sheet for a first duration of at least 100 seconds.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In a first embodiment, a laminate comprising includes a metal substrate and a sliding layer overlying the metal substrate. The sliding layer can include a polymer fabric. The polymer fabric can include first polymer P1. The sliding layer can further included a melt-processable matrix polymer. The melt-processable matrix polymer can include a second polymer P2. In embodiments, either P1 or P2 is a fluoropolymer.

In this regard, melt-processable matrix polymers are converted to shaped articles through a stage which involves obtaining the matrix polymer in a molten state. For easy processing it is necessary to achieve a melt viscosity which is sufficiently low to permit the matrix polymer to flow into a shape, such as a mold or a fabric to be filled completely without the use of abnormally high pressures. In the case of some polymers this is achieved at the expense of using such a high melt temperature that polymer degradation becomes a problem. Alternatively, the molecular weight must be restricted below the optimum value for the best mechanical properties.

In embodiments, the melt-processable matrix polymer can have a melt range from 275° C. to 390° C., from 300° C. to 390° C., from 325° C. to 390° C., from 275° C. to 370° C., from 275° C. to 350° C., from 300° C. to 370° C., from 325° C. to 350° C.

Figure 1:
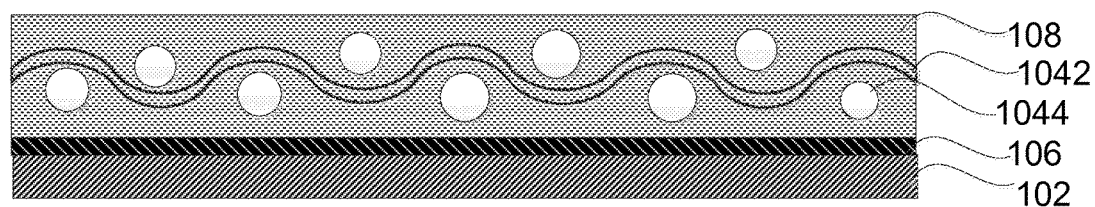
FIG. 1 shows an exemplary laminate in schematic sectional view.
Figure 2:
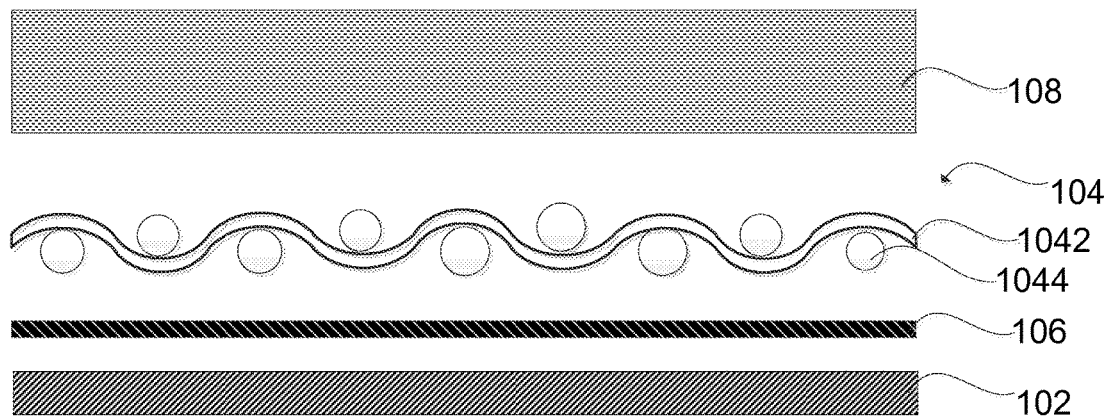
FIG. 2 shows the parts prior to the lamination process.

Referring to FIG. 1, showing a completed laminate, and FIG. 2, showing various elements of the laminate, the laminate includes a metal substrate 102. The metal substrate 102 can be of any structure or shape. In embodiments, the metal substrate can be a plate, a sheet, a woven fabric, a mesh, or metal foam. In embodiments, the metal substrate 102 includes steel, cold-rolled steel, such as material No. 1.0338 (European designation number), cold-rolled steel material No. 1.0347, matt zinc-plated steel, stainless steel material No. 1.4512, stainless steel material No. 1.4720, stainless steel material No. 1.4310. In other embodiments, the metal substrate 102 can include aluminum, alloys, or any combinations thereof.

In order to ensure adhesion of the overlying layers to the metal substrate 102, the surface of the metal substrate which is to be covered can be pretreated in a suitable manner. Such treatment can include roughening the surface, increasing the surface area, patterning the surface area, or coating the surface with another metallic material. For example, the metal substrate surface can be treated by chromating, sintering, embossing, or chemical treatment.

In embodiments, where substrate 102 includes a coating, the coating can be a metal or alloy. Such metal or alloy can include chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, bismuth, or any combination thereof.

In other embodiments, the coating can be copper alloy, copper-tin alloy, copper-zinc alloy, bronze, phosphor bronze, silicon bronze, brass, or combinations thereof.

Independent from the type of metal or treatment of its surface, the metal substrate 102 can have a surface roughness of less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, or less than about 1 micron. Likewise, the metal substrate can have a minimum surface roughness of at least about 1 micron, at least about 2 microns, at least about 5 microns, at least about 10 microns, at least about 20 microns, at least about 50 microns, at least about 100 microns, at least about 200 microns, at least about 400 microns. In a particular embodiment, the surface roughness can range from 1 to 100 microns, such as from 5 to 75 microns, or from 10 to 50 microns.

Metal substrate 102 can have a thickness of at least about 0.05 mm, such as of at least about 0.1 mm, at least about 0.15 mm, at least about 0.2 mm, at least about 0.25 mm, at least about 0.3 mm, at least about 0.35 mm, at least about 0.4 mm, or at least about 0.45 mm. In another embodiment, the thickness of metal substrate 102 is not greater than about 2 mm, such as not greater than about 1.8 mm, not greater than about 1.6 mm, not greater than about 1.4 mm, not greater than about 1.2 mm, not greater than about 1 mm, not greater than about 0.95 mm, not greater than about 0.9 mm, not greater than about 0.85 mm, not greater than about 0.8 mm, not greater than about 0.75 mm, not greater than about 0.7 mm, not greater than about 0.65 mm, not greater than about 0.6 mm, not greater than about 0.55 mm, not greater than about 0.5 mm, not greater than about 0.4 mm, or not greater than about 0.3 mm. In one particular embodiment, the thickness of layer 102 ranges from about 0.3 mm to about 1.5 mm, such as from about 0.4 mm to about 1.2 mm, or from 0.5 mm to about 1 mm.

Referring to FIGS. 1 and 2, a sliding layer (108+1042+1044) can overlie the metal substrate 102. The sliding layer has a ply 104 of polymer fabric embedded. The ply includes warp yarns 1042 and weft yarns 1044. In embodiments, the warp 1042 and the weft 1044 can be in an orthogonal orientation, i.e., the angle between all the warp direction and the weft direction is about 90°. In another embodiment, the angle between the warp direction and the weft direction can be non-orthogonal, i.e. the angle is between 0° and 90°. For example, in one embodiment, a skewed angle between the warp direction and weft direction can be about 45°.

It is also contemplated the laminate includes at least two plies of polymer fabric overlying each other. Accordingly, it is also contemplated that in cases of at least two plies, the assembly can include of orthogonal warp/weft fabrics and non-orthogonal warp/weft fabrics.

In embodiments the warp yarn 1042 or weft yarn 1044 can have the same thickness or different thickness. In embodiments, either thickness can be at least about 0.02 mm, such as at least about 0.04 mm, at least about 0.06 mm, at least about 0.08 mm, at least about 0.1 mm, at least about 0.12 mm, at least about 0.14 mm, or at least about 0.16 mm. In another embodiment, the yarn thickness can be not greater than about 0.3 mm, such as not greater than about 0.28 mm, not greater than about 0.26 mm, not greater than about 0.24 mm, not greater than about 0.22 mm, not greater than about 0.2 mm, or not greater than about 0.18 mm. In one particular embodiment, the yarn thickness can range from about 0.16 mm to about 0.18 mm.

Each ply according to embodiments can have a weight of at least about 100 g/m², such as at least about 120 g/m², at least about 140 g/m², at least about 160 g/m², at least about 180 g/m², at least about 200 g/m², at least about 220 g/m², at least about 240 g/m², at least about 260 g/m², at least about 280 g/m², or at least about 300 g/m². In another embodiment, the ply can have a weight of not greater than about 500 g/m², not greater than about 480 g/m², not greater than about 460 g/m², not greater than about 440 g/m², not greater than about 420 g/m², not greater than about 400 g/m², not greater than about 380 g/m², not greater than about 360 g/m², not greater than about 340 g/m², or not greater than about 320 g/m². In one particular embodiment, the weight can range from about 280 g/m² to about 340 g/m².

Addressing the thread counts of the polymer fabric, the ply has a warp thread count and a weft thread count. The warp thread count and the weft thread count can be the same or different. Either thread count can be at least about 100 threads/10 cm, such as at least about 125 threads/10 cm, at least about 150 threads/10 cm, at least about 175 threads/10 cm, at least about 200 threads/10 cm, at least about 225 threads/10 cm, at least about 250 threads/10 cm, at least about 275 threads/10 cm, at least about 300 threads/10 cm, at least about 325 threads/10 cm, or at least about 350 threads/10 cm. In another embodiment, either thread count, warp or weft thread count, can be not greater than about 600 threads/10 cm, such as not greater than about 575 threads/10 cm, not greater than about 550 threads/10 cm, not greater than about 525 threads/10 cm, not greater than about 500 threads/10 cm, not greater than about 475 threads/10 cm, not greater than about 450 threads/10 cm, not greater than about 425 threads/10 cm, not greater than about 400 threads/10 cm, or not greater than about 375 threads/10 cm. In one particular embodiment, the thread count for both yarns are the same and range from about 325 threads/10 cm to 425 threads/10 cm.

Addressing the polymer fabric that constitutes the ply 104, the warp yarn 1042 and weft yarn 1044 can be made from the same polymer material or different polymer materials. The polymer material can be a fluoropolymer or a non-fluoropolymer. Accordingly, one type of yarns, e.g., the warp yarns 1042 can be made entirely of one type of polymer material, e.g., fluoropolymer, while the weft yarn can be made entirely of the other type of polymer material, e.g., non-fluoropolymer. Likewise, the warp yarns 1042 can be made partially of one type of polymer material, e.g., a first yarn 1042' made of a fluoropolymer, a second yarn 1042" made of a non-fluoropolymer, in any repetitive ratio, e.g. (number of 1042')/(number of 1042") can be 1:1, 2:1, 3:1, 4:1, 5:1, 6:1, 1:6, 1:5, 1:4, 1:3, or 1:2.

Fluoropolymer yarns can include PTFE. In one embodiment, the ply can include expanded PTFE. In another embodiment, the fluoropolymer fabric of the ply can include modified polytetrafluoroethylene (MPTFE), ethylene-tetrafluoroethylene (ETFE), perfluoroalkoxyethylene (PFA), tetrafluoroethylene-hexafluoropropylene (FEP), tetrafluoroethylene-perfluoro(methyl vinyl ether) (MFA), polyvinylidene fluoride (PVDF), ethylene-chlorotrifluoroethylene (ECTFE), or any combination thereof. In one embodiment, the fluoropolymer fabric consists essentially of polytetrafluoroethylene (PTFE). In another embodiment, the fluoropolymer fabric consists essentially of modified polytetrafluoroethylene (mPTFE).

Non-fluoropolymer yarns can include polyethylene (PE), including ultrahigh-molecular-weight polyethylene (UHMWPE), polypropylene (PP), polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyoxymethylene (POM), polyetherketone (PEK), aromatic polyesters (Ekonol), or any combination thereof.

With reference to the sliding layer (108+1042+1044), the polymer fabric (104) is present in the sliding layer in an amount of at least about 1 vol %, at least about 2 vol %, at least about 5 vol %, at least about 10 vol %, at least about 15 vol %, at least about 20 vol %, at least about 25 vol %, or at least about 30 vol %. In a particular embodiment, the amount of the polymer fabric is at least about 35 vol %, at least about 40 vol %, at least about 45 vol %, at least about 50 vol %, or at least about 55 vol %.

In another embodiment, the polymer fabric (104) is present in the sliding layer in an amount of not greater than about 60 vol %, such as not greater than about 50 vol %, not greater than about 40 vol %, not greater than about 35 vol %, not greater than about 30 vol %, not greater than about 28 vol %, not greater than about 26 vol %, not greater than about 24 vol %, not greater than about 22 vol %, or not greater than about 20 vol % of the sliding layer.

Still referring to FIGS. 1 and 2, the melt-processable polymer matrix 108 can include a fluoropolymer or a non-fluoropolymer, or a mixture thereof. The matrix 108 can include polyethylene (PE), including ultrahigh-molecular-weight polyethylene (UHMWPE), polypropylene (PP), polyimide (PI), polyamidimide (PAI), polyphenylene sulfide (PPS), polyphenylene sulfone (PPSO2), liquid crystal polymers (LCP), polyether ether ketones (PEEK), polyethersulfone (PES), polyoxymethylene (POM), polyetherketone (PEK), aromatic polyesters (Ekonol), or any combination thereof. The matrix 108 can also include polytetrafluoroethylene (PTFE) or modified polytetrafluoroethylene (mPTFE), tetrafluoroethylene-hexafluoropropylene (FEP), perfluoroalkoxyethylene (PFA), ethylene-tetrafluoroethylene (ETFE), tetrafluoro-ethylene-perfluoro(methyl vinyl ether) (MFA), polyvinylidene fluoride (PVDF), ethylene-chlorotrifluoroethylene (ECTFE), or any mixture thereof.

The matrix polymer 108 can include at least one filler. The filler is selected from fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof. In one embodiment the filler consist essentially of graphite.

In embodiments, the sliding layer or polymer matrix 108 has the filler present in an amount of at least about 1 vol %, at least about 2 vol %, at least about 5 vol %, at least about 10 vol %, at least about 12 vol %, at least about 14 vol %, at least about 16 vol %, or at least about 18 vol %. In other embodiments, the amount of the filler in the sliding layer or the matrix 108 is not greater than about 30 vol %, not greater than about 25 vol %, not greater than about 20 vol %, not greater than about 15 vol %, not greater than about 12 vol %, not greater than about 10 vol %, not greater than about 8 vol %, or not greater than about 6 vol % of the sliding layer.

In embodiments, the polymer matrix prior 108 to lamination can have a thickness of at least about 0.01 mm, such as at least about 0.03 mm, at least about 0.04 mm, at least about 0.05 mm, at least about 0.06 mm, or at least about 0.08 mm. In other embodiments, the polymer matrix prior 108 to lamination can have a thickness of not greater than about 0.5 mm, such as not greater than about 0.4 mm, not greater than about 0.3 mm, not greater than about 0.2 mm, not greater than about 0.15 mm, not greater than about 0.1 mm, or not greater than about 0.08 mm.

In some embodiments, the total amount of fluoropolymer and filler present in the sliding layer is at least about 28 vol %, at least about 29 vol %, at least about 30 vol %, at least about 32 vol %, at least about 34 vol %, at least about 36 vol %, at least about 38 vol %, or at least about 40 vol % of. In other embodiments, the total amount of fluoropolymer and filler is not greater than about 70 vol %, not greater than about 65 vol %, not greater than about 60 vol %, not greater than about 55 vol %, not greater than about 50 vol %, not greater than about 48 vol %, not greater than about 46 vol %, or not greater than about 44 vol % of the sliding layer. In a particular embodiment, the total amount of fluoropolymer and filler ranges from 30 vol % to 70 vol %, such as from 35 vol % to 60 vol %, or from 40 vol % to 55 vol %.

In some embodiments, the sliding layer (108+1042+1044) can have a thickness of at least about 0.01 mm, such as at least about 0.05 mm, at least about 0.1 mm, or at least about 0.2 mm. In other embodiments, the sliding layer can have a thickness of not greater than about 2.0 mm, such as not greater than about 1.5 mm, not greater than about 1.0 mm, not greater than about 0.8 mm, not greater than about 0.5 mm, not greater than about 0.4 mm, or not greater than about 0.35 mm.

Still referring to FIG. 1, in some embodiments an optional adhesive layer 106 can be placed between the metal substrate 102 and the sliding layer. The adhesive layer 106 can include perfluoroalkoxyethylene (PFA), tetrafluoroethylene-perfluoro(methyl vinyl ether) copolymer (MFA), ethylene tetrafluoroethylene (ETFE), tetrafluoroethylene-hexafluoropropylene (FEP), and any combination thereof. In one embodiment, the adhesive layer 106 consist essentially of PFA. The adhesive layer 106 can be applied as a sheet or extruded onto the metal substrate 102.

The adhesive layer 106 prior to the lamination can have a thickness of at least about 2 microns, such as at least about 4 micron, at least about 6 microns, at least about 8 microns, or at least about 10 microns. In other embodiments, the adhesive layer can have a thickness prior to lamination of not greater than about 50 microns, such as not greater than about 40 microns, not greater than about 35 microns, not greater than about 30 microns, not greater than about 25 microns, not greater than about 20 microns, or not greater than about 15 microns.

In an embodiment, the ply 104 of polymer fabric can have a thickness of at least about 0.04 mm, such as of at least about 0.08 mm, at least about 0.12 mm, at least about 0.16 mm, at least about 0.20 mm, at least about 0.24 mm, at least about 0.28 mm, at least about 0.32 mm, or at least about 0.36 mm. In another embodiment, the ply 104 of polymer fabric can have a thickness of not greater than about 1 mm, such as not greater than about 0.8 mm, not greater than about 0.6 mm, not greater than about 0.55 mm, not greater than about 0.5 mm, not greater than about 0.45 mm, not greater than about 0.4 mm, not greater than about 0.38 mm, not greater than about 0.34 mm, not greater than about 0.3 mm, not greater than about 0.26 mm, or not greater than about 0.22 mm. In a particular embodiment, the thickness can be in a range from about 0.22 mm to about 0.28 mm.

Still referring to FIG. 1, in embodiments, adhesive layer 106 can further include at least one filler. In other embodiments, both layers 106 and 108 can include the same or different filler. The filler can be selected from fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulfone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof.

In embodiments, the filler can be present in layer 106 in an amount of at least about 1% by volume, such as at least about 2% by volume, at least about 3% by volume, at least about 5% by volume, at least about 7% by volume, at least about 10% by volume, at least about 12% by volume, at least about 15% by volume, at least about 17% by volume, or at least about 20% by volume. In another embodiment, the filler can be present in an amount of at not greater than about 40% by volume, such as not greater than about 35% by volume, not greater than about 30% by volume, not greater than about 27% by volume, not greater than about 25% by volume, not greater than about 22% by volume, not greater than about 20% by volume, not greater than about 17% by volume, or not greater than about 15% by volume.

Referring to FIG. 1, laminates as displayed can have a total thickness of at least about 0.3 mm, such as at least about 0.4 mm, at least about 0.5 mm, at least about 0.6 mm, at least about 0.7 mm, at least about 0.8 mm, at least about 0.85 mm, at least about 0.9 mm, or at least about 0.95 mm. In another embodiment, the total thickness is not greater than about 2.0 mm, such as not greater than about 1.8 mm, not greater than about 1.6 mm, not greater than about 1.5 mm, not greater than about 1.4 mm, not greater than about 1.3 mm, not greater than about 1.2 mm, not greater than about 1.15 mm, or not greater than about 1.1 mm. In one particular embodiment, the total thickness can range from about 0.85 mm to about 1.15 mm.

In a particular embodiment, the laminates have thermal stability of the coefficient of friction. In one embodiment, the thermal change of the coefficient of friction of the sliding layer $\Delta(COF)_t$ between 150° C. and 25° C., i.e., $\Delta(COF)_t=|COF_{150}-COF_{25}|$ is less than 0.4, such as less than 0.3, less than 0.2, less than 0.15, less than 0.1. In a particular embodiment, $\Delta(COF)_t$ is less than 0.05, less than 0.04, less than 0.03, less than 0.02, or even less than 0.01. In one embodiment, $\Delta(COF)_t$ ranges from 0.01 to 0.2, such as from 0.01 to 0.15, or from 0.011 to 0.10.

Therefore, in one embodiment, the present laminates find particular application in environments with a broad range of temperature changes. For example, in high friction environments of bearings and tolerance rings.

In one embodiment, a bushing can include a load bearing substrate. The load bearing substrate can have a first major surface, a second major surface, and edges. A sliding layer can be bonded to the first surface. The siding layer can have thermal friction stability of $\Delta(COF)_t=|COF_{150}-COF_{25}|<0.4$.

In another particular embodiment, the laminates expose a shift of the coefficient of friction $\Sigma(COF)$ at elevated temperatures. In one embodiment, the sliding layer includes a maximum coefficient of friction $COF_{max}$ between 150° C. and 250° C. Accordingly, the shift can be determined by $\Sigma(COF)=COF_{max}-COF_{25}$. In one embodiment, $\Sigma(COF)$ is greater than 0.1, such as greater than 0.15, greater than 0.2, greater than 0.25, greater than 0.3. In one particular embodiment, $\Sigma(COF)$ is greater than 0.35, such as greater than 0.4. In another embodiment, $\Sigma(COF)$ ranges from 0.1 to 0.5, such as from 0.2 to 0.45, such as from 0.22 to 0.4.

In yet another embodiment, a tolerance ring can include a load bearing substrate. The load bearing substrate can have a first major surface and a second major surface. A sliding layer can be bonded to the first surface. The sliding layer can include a coefficient of friction shift $\Sigma(COF)=COF_{max}-COF_{25}>0.1$.

Referring to FIGS. 1-2, laminates as displayed can be prepared by a time, temperature, and pressured controlled lamination process, wherein metal substrate 102, the ply 104 comprising the polymer fabric, the matrix polymer sheet 108, and optionally layer 106 are assembled to form a pre-lamination stack.

In the time-pressure-temperature controlled lamination process the pre-lamination stack is compressed to at least about 0.2 MPa, such as at least about 0.5 MPa, at least about 1.0 MPa, at least about 1.2 MPa, at least about 1.5 MPa, at least about 1.6 MPa, at least about 1.7 MPa, at least about 1.8 MPa, at least about 1.9 MPa, at least about 2.0 MPa, at least about 2.05 MPa, at least about 2.10 MPa, or at least about 2.15 MPa. In another process example, the pressure is not greater than about 4.0 MPa, such as not greater than about 3.5 MPa, not greater than about 3.0 MPa, not greater than about 2.5 MPa, not greater than about 2.4 MPa, not greater than about 2.35 MPa, not greater than about 2.30 MPa, not greater than about 2.25 MPa, or not greater than about 2.20 MPa.

At the same time, the compressed pre-lamination stack is heated to at least the glass transition temperature $T_g$ of the polymer sheet 108. In another process example, the compressed pre-lamination stack is heated to at least the melting temperature $T_m$ of the adhesive 106. For example the compressed pre-lamination stack can be heated to at least about 320° C., such as at least about 330° C., at least about 340° C., at least about 350° C., at least about 360° C., at least about 370° C., at least about 375° C., at least about 380° C., at least about 385° C., at least about 390° C., at least about 395° C., at least about 400° C., or at least about 405° C. In another process example, the compressed pre-lamination stack can be heated to not more than about 420° C., such as not more than about 415° C., not more than about 410° C., not more than about 405° C., not more than about 400° C., not more than about 395° C., not more than about 390° C., or not more than about 385° C.

Referring further to the lamination process, the pre-lamination stack can be compressed and heated as described above for a duration of at least 100 seconds, such as at least about 110 seconds, such as at least about 120 seconds, at least about 130 seconds, at least about 140 seconds, or at least 145 seconds. The first duration can be not greater than about 250 seconds, such as not greater than about 220 seconds, not greater than about 200 seconds, not greater than about 180 seconds, not greater than about 170 seconds, not greater than about 160 seconds, or not greater than about 150 seconds.

In another process example, after the heating, the stack can be cooled to a second temperature. For example the stack can be cooled to not greater than about 100° C., such as not greater than about 90° C., not greater than about 80° C., not greater than about 70° C., not greater than about 60° C., not greater than about 50° C., not greater than about 40° C., not greater than about 35° C., or not greater than about 30° C. The cooling can occur at a cooling rate of at least 0.0001° C./s and not greater than 10° C./s. In one process example, the cooling rate can be not greater than 8° C./s, such as not greater than 6° C./s, not greater than 4° C./s, not greater than 2° C./s, not greater than 1° C./s, not greater than 0.8° C./s, not greater than 0.6° C./s, not greater than 0.5° C./s, not greater than 0.4° C./s, not greater than 0.3° C./s, not greater than 0.2° C./s, or not greater than 0.1° C./s.

Figure 3:
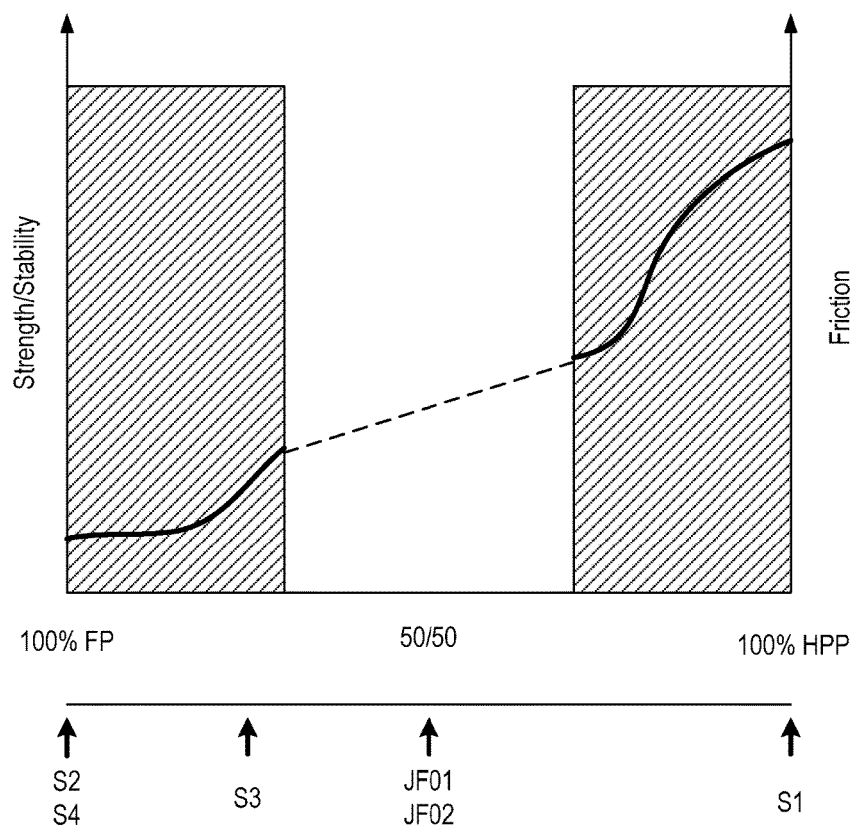
FIG. 3 illustrates the graph of fluoropolymer and performance polymer mixtures and examplatory strength and friction properties thereof.

Prior turning to the Examples, FIG. 3 illustrates the performance of conventional polymer sliding layers. In general, a sliding layer of 100% fluoropolymer (FP) has a low coefficient of friction but also low tensile strength. As a high performance polymer (HPP) is added into the FP and the percentage of the FP, e.g., PTFE, is reduced and replaced by the HPP such as PEEK, both strength/stability but also friction coefficient increase. The crosshatched area describes the approximate amount of HPP that can be filled in a FP on the left side of the graph. The second crosshatched area describes the approximate amount of FP that can be filled in a HPP on the right side of the graph. However, the blank area in the middle shows the forbidden area because stable sliding layers having these mixtures cannot be prepared as the filling capacity of the matrix polymer, i.e., FP or HPP, is limited at about 20 to 30 vol %. The solid line illustrates an exemplary run of the curve for mixtures of sliding layers with FP as the matrix material (left side) or HPP as the matrix material (right side). The dashed line connects the approximate edge values, however actual values are not known.

The embodiments of the present disclosures however allow for an approximation of obtaining mixtures in the forbidden area. The axis underneath the graph in FIG. 3 illustrates the positions of comparative samples (S1-S4) on the graph with S1 being 100% PEEK, S2 being 100% PTFE, S3 being 25 vol % PEEK in 75 vol % PTFE, and S4 being 100% PFA. JF01 is a PEEK fabric embedded in PFA, JF02 is a PTFE fabric embedded in PEEK.

Without limiting the scope of the present disclosure, the following list is an item list comprising embodiments of the foregoing discussed aspects and principles:

Item 1. A laminate comprising:
a metal substrate;
a sliding layer overlying the metal substrate, the sliding layer including
a polymer fabric comprising a first polymer P1,
a melt-processable matrix polymer comprising a second polymer P2, wherein either P1 or P2 is a fluoropolymer.

Item 2. An article comprising a laminate, the laminate comprising:
a metal substrate;
a sliding layer overlying the metal substrate, the sliding layer including
a polymer fabric comprising a first polymer P1,
a matrix polymer comprising a second polymer P2, wherein either P1 or P2 is a fluoropolymer;
wherein the laminate includes an arbitrary bend, the arbitrary bend having a bend radius of at least 0.005 mm.

Item 3. The laminate or the article according to any one of items 1 or 2 further including an adhesive layer between the metal substrate and the sliding layer.

Item 4. The laminate or the article according to item 3, wherein the adhesive layer comprises a polymer selected from the group consisting of perfluoroalkoxyethylene (PFA), ethylene tetrafluoroethylene (ETFE), tetrafluoroethylene-hexafluoropropylene (FEP), and any combination thereof.

Item 5. The laminate or the article according to item 3 or 4, wherein the adhesive layer has a thickness of at least about 2 microns, such as at least about 4 micron, at least about 6 microns, at least about 8 microns, or at least about 10 microns.

Item 6. The laminate or the article according to one of items 3 to 5, wherein the adhesive layer has a thickness of not greater than about 50 microns, such as not greater than about 40 microns, not greater than about 35 microns, not greater than about 30 microns, not greater than about 25 microns, not greater than about 20 microns, or not greater than about 15 microns.

Item 7. The laminate or the article according to any one of items 1 to 6, wherein P1 comprises a fluoropolymer and P2 comprises a non-fluoropolymer.

Item 8. The laminate or the article according to any one of items 1 to 6, wherein P1 comprises a non-fluoropolymer and P2 comprises a fluoropolymer.

Item 9. The laminate or the article according to any one of items 1 to 7, wherein P1 consist essentially of a fluoropolymer and P2 comprises a non-fluoropolymer.

Item 10. The laminate or the article according to any one of items 1 to 6 or 8, wherein P1 comprises a non-fluoropolymer and P2 consist essentially of a fluoropolymer.

Item 11. The laminate or the article according to any one of items 1 to 10, wherein P1 comprises fibers of a fluoropolymer.

Item 12. The laminate or the article according to any one of the foregoing items, wherein the fluoropolymer is selected form the group consisting of polytetrafluoroethylene (PTFE), tetrafluoroethylene-hexafluoropropylene (FEP), perfluoroalkoxyethylene (PFA), ethylene-tetrafluoroethylene (ETFE), tetrafluoro-ethyleneperfluoro(methyl vinyl ether) (MFA), modified polytetrafluoroethylene (TFM), polyvinylidene fluoride (PVDF), ethylene-chlorotrifluoroethylene (ECTFE).

Item 13. The laminate or the article according to item 12, wherein the fluoropolymer consists essentially of polytetrafluoroethylene (PTFE) or modified polytetrafluoroethylene (TFM).

Item 14. The laminate or the article according to any one of items 7 through 13, wherein the non-fluoropolymer is selected from the group consisting of polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), polyethersulfone (PES), polyetherketone (PEK), and any combination thereof.

Item 15. The laminate or the article according to any one of the foregoing items, wherein the polymer fabric is present at least about 1 vol %, at least about 2 vol %, at least about 5 vol %, at least about 10 vol %, at least about 15 vol %, at least about 20 vol %, at least about 25 vol %, or at least about 30 vol % of the sliding layer.

Item 16. The laminate or the article according to any one of the foregoing items, wherein the polymer fabric is present not greater than about 40 vol %, not greater than about 35 vol %, not greater than about 30 vol %, not greater than about 28 vol %, not greater than about 26 vol %, not greater than about 24 vol %, not greater than about 22 vol %, or not greater than about 20 vol % of the sliding layer.

Item 17. The laminate or the article according to any one of the foregoing items, wherein the melt-processable matrix polymer has a melt range from 275° C. to 390° C., from 300° C. to 390° C., from 325° C. to 390° C., from 275° C. to 370° C., from 275° C. to 350° C., from 300° C. to 370° C., from 325° C. to 350° C.

Item 18. The laminate or the article according to any one of the foregoing items, wherein the sliding layer further comprises at least one filler.

Item 19. The laminate or the article according to item 18, wherein the at least one filler is selected from fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof.

Item 20. The laminate or the article according to one of items 17 to 19, wherein the at least one filler is present at least about 1 vol %, at least about 2 vol %, at least about 5 vol %, at least about 10 vol %, at least about 12 vol %, at least about 14 vol %, at least about 16 vol %, or at least about 18 vol % of the sliding layer.

Item 21. The laminate or the article according to one of items 17 to 20, wherein the at least one filler is present not greater than about 30 vol %, not greater than about 25 vol %, not greater than about 20 vol %, not greater than about 15 vol %, not greater than about 12 vol %, not greater than about 10 vol %, not greater than about 8 vol %, or not greater than about 6 vol % of the sliding layer.

Item 22. The laminate or the article according to any one of the preceding items, wherein a total amount of fluoropolymer and filler is at least about 28 vol %, at least about 29 vol %, at least about 30 vol %, at least about 32 vol %, at least about 34 vol %, at least about 36 vol %, at least about 38 vol %, or at least about 40 vol % of the sliding layer.

Item 23. The laminate or the article according to any one of the preceding items, wherein a total amount of fluoropolymer and filler is not greater than about 70 vol %, not greater than about 65 vol %, not greater than about 60 vol %, not greater than about 55 vol %, not greater than about 50 vol %, not greater than about 48 vol %, not greater than about 46 vol %, or not greater than about 44 vol % of the sliding layer.

Item 24. The laminate or the article according to any one of the preceding items, wherein the metal substrate has a surface roughness of less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, or less than about 1 micron.

Item 25. The laminate or the article according to any one of the preceding items, wherein the metal substrate has a surface roughness of at least about 1 micron, at least about 2 microns, at least about 5 microns, at least about 10 microns, at least about 20 microns, at least about 50 microns, at least about 100 microns, at least about 200 microns, or at least about 400 microns.

Item 26. The laminate or the article according to any one of the preceding items, wherein the metal substrate comprises steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

Item 27. The laminate or the article according to any one of the preceding items, wherein the metal substrate further comprises a coating.

Item 28. The laminate or the article according to item 27, wherein the coating is a metal or alloy comprising a metal selected from the group consisting of chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, and bismuth.

Item 29. The laminate or the article according to item 27, wherein the coating is selected from the group consisting of copper alloy, copper-tin alloy, copper-zinc alloy, bronze, phosphor bronze, silicon bronze, brass, and combinations thereof.

Item 30. The laminate or the article according to any one of the preceding items, wherein the sliding layer has a thickness of at least about 0.01 mm, such as at least about 0.05 mm, at least about 0.1 mm, or at least about 0.2 mm.

Item 31. The laminate or the article according to any one of the preceding items, wherein the sliding layer has a thickness of not greater than about 2.0 mm, such as not greater than about 1.5 mm, not greater than about 1.0 mm, not greater than about 0.8 mm, not greater than about 0.5 mm, not greater than about 0.4 mm, or not greater than about 0.35 mm.

Item 32. The laminate or the article according to any one of the preceding items, wherein the polymer fabric has a thickness of at least about 0.04 mm, such as of at least about 0.08 mm, at least about 0.12 mm, at least about 0.16 mm, at least about 0.20 mm, at least about 0.24 mm, at least about 0.28 mm, at least about 0.32 mm, or at least about 0.36 mm.

Item 33. The laminate or the article according to any one of the preceding items, wherein the polymer fabric has a thickness of not greater than about 1 mm, such as not greater than about 0.8 mm, not greater than about 0.6 mm, not greater than about 0.55 mm, not greater than about 0.5 mm, not greater than about 0.45 mm, not greater than about 0.4 mm, not greater than about 0.38 mm, not greater than about 0.34 mm, not greater than about 0.3 mm, not greater than about 0.26 mm, or not greater than about 0.22 mm.

Item 34. The laminate or the article according to any one of the preceding items, wherein the polymer fabric has a yarn thickness of at least about 0.02 mm, such as at least about 0.04 mm, at least about 0.06 mm, at least about 0.08 mm, at least about 0.1 mm, at least about 0.12 mm, at least about 0.14 mm, or at least about 0.16 mm.

Item 35. The laminate or the article according to any one of the preceding items, wherein the polymer fabric has a yarn thickness of at not greater than about 0.3 mm, such as not greater than about 0.28 mm, not greater than about 0.26 mm, not greater than about 0.24 mm, not greater than about 0.22 mm, not greater than about 0.2 mm, or not greater than about 0.18 mm.

Item 36. The laminate or the article according to any one of the preceding items, wherein the polymer fabric has a weight of at least about 100 g/m$^2$, such as at least about 120 g/m$^2$, at least about 140 g/m$^2$, at least about 160 g/m$^2$, at least about 180 g/m$^2$, at least about 200 g/m$^2$, at least about 220 g/m$^2$, at least about 240 g/m$^2$, at least about 260 g/m$^2$, at least about 280 g/m$^2$, or at least about 300 g/m$^2$.

Item 37. The laminate or the article according to any one of the preceding items, wherein the polymer fabric has a weight of not greater than about 500 g/m$^2$, not greater than about 480 g/m$^2$, not greater than about 460 g/m$^2$, not greater than about 440 g/m$^2$, not greater than about 420 g/m$^2$, not greater than about 400 g/m$^2$, not greater than about 380 g/m$^2$, not greater than about 360 g/m$^2$, not greater than about 340 g/m$^2$, or not greater than about 320 g/m$^2$.

Item 38. The laminate or the article according to any one of the preceding items, wherein the polymer fabric has a warp thread count of at least about 100 threads/10 cm, such as at least about 125 threads/10 cm, at least about 150 threads/10 cm, at least about 175 threads/10 cm, at least about 200 threads/10 cm, at least about 225 threads/10 cm, at least about 250 threads/10 cm, at least about 275 threads/10 cm, at least about 300 threads/10 cm, at least about 325 threads/10 cm, or at least about 350 threads/10 cm.

Item 39. The laminate or the article according to any one of the preceding items, wherein the polymer fabric has a warp thread count of not greater than about 600 threads/10 cm, such as not greater than about 575 threads/10 cm, not greater than about 550 threads/10 cm, not greater than about 525 threads/10 cm, not greater than about 500 threads/10 cm, not greater than about 475 threads/10 cm, not greater than about 450 threads/10 cm, not greater than about 425 threads/10 cm, not greater than about 400 threads/10 cm, or not greater than about 375 threads/10 cm.

Item 40. The laminate or the article according to any one of the preceding items, wherein the polymer fabric has a weft thread count of at least about 100 threads/10 cm, such as at least about 125 threads/10 cm, at least about 150 threads/10 cm, at least about 175 threads/10 cm, at least about 200 threads/10 cm, at least about 225 threads/10 cm, at least about 250 threads/10 cm, at least about 275 threads/10 cm, at least about 300 threads/10 cm, at least about 325 threads/10 cm, or at least about 350 threads/10 cm.

Item 41. The laminate or the article according to any one of the preceding items, wherein the polymer fabric has a weft thread count of not greater than about 600 threads/10 cm, such as not greater than about 575 threads/10 cm, not greater than about 550 threads/10 cm, not greater than about 525 threads/10 cm, not greater than about 500 threads/10 cm, not greater than about 475 threads/10 cm, not greater than about 450 threads/10 cm, not greater than about 425 threads/10 cm, not greater than about 400 threads/10 cm, or not greater than about 375 threads/10 cm.

Item 42. The article according to any one of items 2 to 41, wherein the article comprises a bearing or a bushing.

Item 43. The article according to item 42, wherein the bearing includes a sleeve bearing, a half-shell sleeve bearing, a spherical bearing, or a combination thereof.

Item 44. The article according to items 42 or 43, wherein the bearing or bushing includes one flange or two flanges.

Item 45. A method of manufacturing a laminate, the method comprising:
providing a metal substrate;
overlying a ply of a polymer fabric onto the metal substrate;
overlying a polymer sheet onto the ply opposite to the metal substrate to form a stack;

compressing the stack at a pressure of at least 0.05 MPa; and heating the stack to a temperature of at least the glass transition temperature $T_g$ of the polymer sheet for a first duration of at least 100 seconds.

Item 46. A method of manufacturing a laminate, the method comprising:

providing a metal substrate;

applying an adhesive sheet onto the metal substrate;

overlying a ply of a polymer fabric onto the adhesive sheet;

overlying a polymer sheet onto the ply opposite to the metal substrate to form a stack;

compressing the stack at a pressure of at least about 0.05 MPa; and heating the stack to a first temperature of at least the melting temperature $T_m$ of the adhesive sheet for a first duration of at least 100 seconds.

Item 47. The method according to items 45 or 46, further comprising, after the heating, cooling the stack to a second temperature at a cooling rate of at least 0.0001° C./s and not greater than 2° C./s.

Item 48. The method according to any one of the items 45 through 47, wherein the pressure is at least about 0.1 MPa, at least about 0.2 MPa, at least about 0.3 MPa, at least about 0.4 MPa, at least about 0.5 MPa, at least about 0.6 MPa, at least about 0.8 MPa, or at least about 1.0 MPa.

Item 49. The method according to any one of the items 45 through 48, wherein the pressure is not greater than about 4.0 MPa, such as not greater than about 3.0 MPa, not greater than about 2.5 MPa, not greater than about 2.0 MPa, not greater than about 1.5 MPa, not greater than about 1.2 MPa, not greater than about 1.1 MPa, not greater than about 0.9 MPa, or not greater than about 0.7 MPa.

Item 50. The method according to any one of items 45 through 49, wherein the first duration is at least 110 seconds, such as at least 120 seconds, at least 130 seconds, at least 140 seconds, or at least 145 seconds.

Item 51. The method according to any one of items 45 through 50, wherein the first duration is not greater than 250 seconds, such as not greater than 220 seconds, not greater than 200 seconds, not greater than 180 seconds, not greater than 170 seconds, not greater than 160 seconds, or not greater than 150 seconds.

Item 52. The method according to any one of items 47 through 51, wherein the cooling rate is not greater than 1.8° C./s, such as not greater than 1.6° C./s, not greater than 1.4° C./s, not greater than 1.2° C./s, not greater than 1.0° C./s, not greater than 0.8° C./s, not greater than 0.6° C./s, not greater than 0.5° C./s, not greater than 0.4° C./s, not greater than 0.3° C./s, not greater than 0.2° C./s, or not greater than 0.1° C./s.

Item 53. The method according to any one items 46 through 52, wherein the adhesive is selected from the group consisting of tetrafluoroethylene-hexafluoropropylene (FEP), modified tetrafluoroethylene-hexafluoropropylene (mFEP), perfluoroalkoxyethylene (PFA), modified perfluoroalkoxyethylene (mPFA), polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), ethylene-tetrafluoroethylene (ETFE), tetrafluoro-ethylene-perfluoro(methyl vinyl ether) (MFA), modified polytetrafluoroethylene (mPTFE), polyvinylidene fluoride (PVDF), ethylene-chlorotrifluoroethylene (ECTFE), polyethersulfone (PES), polyetherketone (PEK), and any combination thereof.

Item 54. The method according to item 53, wherein the adhesive comprises perfluoroalkoxyethylene (PFA).

Item 55. The method according to item 54, wherein the adhesive consists essentially of perfluoroalkoxyethylene (PFA).

Item 56. The method according to any one items 45 through 55, wherein the polymer fabric or the polymer sheet are selected from the group consisting of polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoro-ethylene-perfluoro(methyl vinyl ether) (MFA), polyvinylidene fluoride (PVDF), ethylene-chlorotrifluoroethylene (ECTFE), and any combination thereof.

Item 57. The method according to item 56, wherein the polymer fabric comprises polytetrafluoroethylene (PTFE) or modified polytetrafluoroethylene (mPTFE).

Item 58. The method according to item 57, wherein the polymer fabric consists essentially of polytetrafluoroethylene (PTFE) or modified polytetrafluoroethylene (mPTFE).

Item 59. The method according to item 56, wherein the polymer sheet comprises polytetrafluoroethylene (PTFE) or modified polytetrafluoroethylene (mPTFE).

Item 60. The method according to item 59, wherein the polymer sheet consists essentially of polytetrafluoroethylene (PTFE) or modified polytetrafluoroethylene (mPTFE).

Item 61. The method according to any one of items 45 through 60, wherein the polymer fabric or the polymer sheet further comprises at least one filler.

Item 62. The method according to item 61, wherein the at least one filler is selected from fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof.

Item 63. The method according to item 61 or 62, wherein the at least one filler is present in an amount of at least about 1% by volume, such as at least about 2% by volume, at least about 3% by volume, at least about 5% by volume, at least about 7% by volume, at least about 10% by volume, at least about 12% by volume, at least about 15% by volume, at least about 17% by volume, or at least about 20% by volume in the polymer fabric or the polymer sheet.

Item 64. The method according to one of items 61 to 63, wherein the at least one filler is present in an amount of at not greater than about 40% by volume, such as not greater than about 35% by volume, not greater than about 30% by volume, not greater than about 27% by volume, not greater than about 25% by volume, not greater than about 22% by volume, not greater than about 20% by volume, not greater than about 17% by volume, or not greater than about 15% by volume in the polymer fabric or the polymer sheet.

Item 65. The method according to any one of items 45 through 64, wherein a total amount of fluoropolymer and filler is at least about 28 vol %, at least about 29 vol %, at least about 30 vol %, at least about 32 vol %, at least about 34 vol %, at least about 36 vol %, at least about 38 vol %, or at least about 40 vol % of the sliding layer.

Item 66. The method according to any one of items 45 through 65, wherein a total amount of fluoropolymer and filler is not greater than about 70 vol %, not greater than about 65 vol %, not greater than about 60 vol %, not greater than about 55 vol %, not greater than about 50 vol %, not greater than about 48 vol %, not greater than about 46 vol %, or not greater than about 44 vol % of the sliding layer.

Item 67. The method according to any one of items 45 through 66, wherein the polymer fabric is selected from the group consisting of polyether-ether-ketone (PEEK), polyetherketone (PEK), polyimide (PI), polyamideimide (PAI), liquid crystal polymer (LCP), polyamide (PA), polyoxymethylene (POM), and any combination thereof.

Item 68. The method according to item 67, wherein the polymer fabric comprises polyetherether ketone (PEEK).

Item 69. The method according to item 67, wherein the polymer fabric consists essentially of polyetherether ketone (PEEK).

Item 70. The method according to any one of items 45 through 69, wherein the polymer sheet has a thickness of at least about 0.03 mm, such as of at least about 0.04 mm, at least about 0.05 mm, at least about 0.06 mm, at least about 0.07 mm, at least about 0.08 mm, at least about 0.09 mm, or at least about 0.1 mm.

Item 71. The method according to any one of items 45 through 70, wherein the polymer sheet has a thickness of not greater than about 0.2 mm, such as not greater than about 0.18 mm, not greater than about 0.16 mm, not greater than about 0.14 mm, not greater than about 0.12 mm, not greater than about 0.1 mm, not greater than about 0.095 mm, not greater than about 0.09 mm, not greater than about 0.085 mm, not greater than about 0.08 mm, not greater than about 0.075 mm, not greater than about 0.07 mm, not greater than about 0.065 mm, or not greater than about 0.06 mm.

Item 72. The method according to any one of items 45 through 71, wherein the ply has a thickness of at least about 0.04 mm, such as of at least about 0.08 mm, at least about 0.12 mm, at least about 0.16 mm, at least about 0.20 mm, at least about 0.24 mm, at least about 0.28 mm, at least about 0.32 mm, or at least about 0.36 mm.

Item 73. The method according to any one of items 45 through 72, wherein the ply has a thickness of not greater than about 1 mm, such as not greater than about 0.8 mm, not greater than about 0.6 mm, not greater than about 0.55 mm, not greater than about 0.5 mm, not greater than about 0.45 mm, not greater than about 0.4 mm, not greater than about 0.38 mm, not greater than about 0.34 mm, not greater than about 0.3 mm, not greater than about 0.26 mm, or not greater than about 0.22 mm.

Item 74. The method according to any one of items 45 through 73, further comprising chemically etching the polymer fabric prior to the overlying of the polymer sheet.

Item 75. The method according to item 74, wherein the chemically etching includes soaking the polymer fabric in ammonia.

Item 76. The method according to any one of items 45 through 75, further including shaping the laminate into a bearing or bushing.

Item 77. The method according to item 76, wherein the shaping includes rolling, bending, deep drawing, stamping, pressing, or any combination thereof.

EXAMPLES

General

In the following examples, a cold rolled steel substrate was overlaid with a PFA sheet, a fluoropolymer fabric, and a PEEK polymer sheet. The fluoropolymer fabric was selected from two types of PTFE fabric, namely Gore-Rastex® CCC 216 (37/37 threads/cm; twill 3/1) or Teflon-Gewebe TC 117 (24/22 threads/cm). PFA was selected as an adhesive. The assemblies were laminated at pressures between 0.3 MPa to 0.5 MPa and a temperature between 350° C. and 410° C., for 100 to 200 seconds. Afterwards, the laminates were quickly cooled with water to 40° C. In all experiments, the fluoropolymer fabric is an internal layer of the laminate.

Example 1

A PEEK layer (Vestakeep 0FH81) having a thickness of 0.075 mm was placed on a PTFE polymer fabric (Gore-Rastex® CCC 216; 37/37 threads/cm; twill 3/1) having a thickness of 0.25 mm. A PFA sheet, 30 microns thick was placed on the polymer fabric opposite to the PEEK layer. A cold rolled steel substrate (0.23 mm thick) was placed on the PFA sheet opposite to the PEEK layer. The assembly was laminated according to procedure described above.

Example 2

A PEEK layer (Vestakeep 0FH81) having a thickness of 0.075 mm was placed on a PTFE polymer fabric (Gore-Rastex® CCC 216; 37/37 threads/cm; twill 3/1) having a thickness of 0.25 mm. A PFA sheet, 30 microns thick was placed on the polymer fabric opposite to the PEEK layer. An aluminum substrate was placed on the PFA sheet opposite to the PEEK layer. The assembly was laminated according to procedure described above.

Example 3

An PEEK layer (Vestakeep 0FH80) having a thickness of 0.100 mm was placed on a PTFE polymer fabric (Teflon-Gewebe TC 117; 24/22 threads/cm) having a thickness of 0.27 mm. A PFA sheet, 30 microns thick was placed on the polymer fabric opposite to the PEEK layer. A cold rolled steel substrate (0.23 mm thick) was placed on the PFA sheet opposite to the PEEK layer. The assembly was laminated according to procedure described above.

Example 4

An PEEK layer (Vestakeep 0FH80) having a thickness of 0.100 mm was placed on a PTFE polymer fabric (Teflon- Gewebe TC 117; 24/22 threads/cm) having a thickness of 0.27 mm. A PFA sheet, 30 microns thick was placed on the polymer fabric opposite to the PEEK layer. An aluminum substrate was placed on the PFA sheet opposite to the PEEK layer. The assembly was laminated according to procedure described above.

Example 5

A sample of Example 2 was compared to a conventional product, Comparative Example 1, (GGB HI-EX®, from GGB Bearing Technology). An analysis of the sliding layer of Comparative Example 1 showed a bronze filler content of about 13.3 wt %, a graphite filler content of about 0.5 wt %, a PTFE content of about 8 wt %, and the remainder PEEK (78.2 wt %).

Both samples were tested in a Journal Bearing Tester at a load of 4.8 MPa and a journal speed of 0.058 m/s for about 2 hrs. A comparison of the mean of coefficient of friction averages showed that Example 2 maintained a 44% lower friction than Comparative Example 1.

Example 6

The tensile and compressive properties was evaluated with for conventional samples S1-S4 and two samples comprising a PEEK fabric in a PFA matrix (JF01) and a PTFE fabric in a PEEK matrix (JF02). Comparative Sample S1 is 100% PEEK (Aptiv 1000-250G), S2 is 100% PTFE (Daikin M12), S3 is 75% PTFE and 25% PEEK, and S4 100% PFA.

Layers were prepared having a thickness of 250 microns. Densities of the materials are shown in Table 1. The tensile strength in longitudinal direction (lamination direction) and across the lamination direction were measured and the loss of thickness of the layers after compression of the samples at 400 MPa were measured.

TABLE 1

| Sample | S1 | S2 | S3 | S4 | JF01 | JF02 |
|---|---|---|---|---|---|---|
| density [g/cm$^3$] | 1.28 | 2.13 | 1.87 | 2.12 | 1.7 | 1.77 |
| Tensile Strength [N/mm$^2$] | | | | | | |
| long. | 102 | 40 | 12 | 26 | 38 | 150 |
| across | 104 | 42 | 14 | 27 | 10 | 170 |
| Compression [µm] | 90 | 190 | 170 | 150 | 160 | 110 |

As can be seen in Table 1, JF02 shows an improvement of the tensile strength over the pure matrix material S1 while also maintaining superior compression properties. As for JF01, this composite material shows improved tensile strength in longitudinal direction over its sole matrix material S4, while also maintaining the compression properties.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A laminate comprising:
   a metal substrate;
   a sliding layer overlying the metal substrate, the sliding layer including a polymer fabric comprising a first polymer P1,
   a melt-processable matrix polymer comprising a second polymer P2, and
   at least one filler,
      wherein either P1 or P2 is a fluoropolymer,
      wherein the total amount of fluoropolymer and filler is at least 30 vol % of the sliding layer, wherein the laminate includes an arbitrary bend, the arbitrary bend having a bend radius of at least 0.005 mm, and wherein the polymer fabric is present in at least 25 vol % of the sliding layer.

2. An article comprising a laminate, the laminate comprising:
   a metal substrate;
   a sliding layer overlying the metal substrate, the sliding layer including
      a polymer fabric comprising a first polymer P1,
      a matrix polymer comprising a second polymer P2; and
      at least one filler, wherein the total amount of fluoropolymer and filler is at least 30 vol % of the sliding layer, wherein either P1 or P2 is a fluoropolymer;
      wherein the laminate includes an arbitrary bend, the arbitrary bend having a bend radius of at least 0.005 mm, and wherein the polymer fabric is present in at least 25 vol % of the sliding layer.

3. The laminate according to claim 1 further including an adhesive layer between the metal substrate and the sliding layer.

4. The laminate according to claim 1, wherein P1 comprises a fluoropolymer and P2 comprises a non-fluoropolymer.

5. The laminate according to claim 1, wherein P1 comprises a non-fluoropolymer and P2 comprises a fluoropolymer.

6. The laminate according to claim 1, wherein P1 comprises fibers of a fluoropolymer.

7. The laminate according to claim 1, wherein the fluoropolymer is selected from the group consisting of polytetrafluoroethylene (PTFE), tetrafluoroethylene-hexafluoropropylene (FEP), perfluoroalkoxyethylene (PFA), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), and ethylene-chlorotrifluoroethylene (ECTFE).

8. The laminate according to claim 1, wherein the non-fluoropolymer is selected from the group consisting of polyimide (PI), polyamidimide (PAI), polyphenylene sulfide (PPS), polyphenylene sulfone (PPSO2), liquid crystal polymers (LCP), polyether ether ketones (PEEK), aromatic polyesters (Ekonol), polyethersulfone (PES), polyetherketone (PEK), and any combination thereof.

9. The laminate according to claim 1, wherein the polymer fabric has a warp thread count of at least about 100 threads/10 cm.

10. The laminate according to claim 1, wherein the polymer fabric has a warp thread count of not greater than about 600 threads/10 cm.

11. The article according to claim 2, wherein the article comprises a bearing or a bushing.

12. The article according to claim 11, wherein the bearing or bushing includes one flange or two flanges.

13. The laminate according to claim 3, wherein the adhesive layer has a thickness of at least about 2 microns.

14. The laminate according to claim 3, wherein the adhesive layer has a thickness of not greater than 50 microns.

15. The laminate according to claim 4, wherein P1 comprises fibers of a fluoropolymer.

16. The laminate according to claim 1, wherein the polymer fabric is present in at least about 1 vol % of the sliding layer.

17. The laminate according to claim 1, wherein the polymer fabric is present in not greater than about 40 vol % of the sliding layer.

18. The laminate according to claim 1, wherein the at least one filler is selected from fibers, glass fibers, carbon fibers, aramids, inorganic materials, ceramic materials, carbon, glass, graphite, aluminum oxide, molybdenum sulfide, bronze, silicon carbide, woven fabric, powder, sphere, thermoplastic material, polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), mineral materials, wollastonite, barium sulfate, or any combinations thereof.

19. The laminate according to claim 18, wherein the at least one filler is present in not greater than about 30 vol % of the sliding layer.

\* \* \* \* \*

UNITED STATES PATENT AND TRADEMARK OFFICE
CERTIFICATE OF CORRECTION

PATENT NO.         : 10,307,991 B2
APPLICATION NO.    : 14/502995
DATED              : June 4, 2019
INVENTOR(S)        : Jens Speicher et al.

Page 1 of 1

It is certified that error appears in the above-identified patent and that said Letters Patent is hereby corrected as shown below:

In the Claims

Column 20, Lines 40-55, please delete Claim 1 and insert as follows:
--1. A laminate comprising:
a metal substrate;
a sliding layer overlying the metal substrate, the sliding layer including
    a polymer fabric comprising a first polymer P1,
    a melt-processable matrix polymer comprising a second polymer P2, and
    at least one filler,
        wherein either P1 or P2 is a fluoropolymer,
        wherein the total amount of fluoropolymer and filler is at least 30 vol% of the sliding layer, wherein the laminate includes an arbitrary bend, the arbitrary bend having a bend radius of at least 0.005 mm, and wherein the polymer fabric is present in at least 25 vol % of the sliding layer.--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*